United States Patent [19]

Tanaka et al.

[11] Patent Number: 4,498,256
[45] Date of Patent: Feb. 12, 1985

[54] ITEM INPUT DEVICE FOR A DATA PROCESSING SYSTEM

[75] Inventors: Toshiaki Tanaka; Masao Fukai; Tatsuro Onuma; Ryohei Kinoshita, all of Suzaka, Japan

[73] Assignee: Fujitsu Limited, Kawasaki, Japan

[21] Appl. No.: 292,913

[22] Filed: Aug. 14, 1981

[30] Foreign Application Priority Data

Sep. 4, 1980 [JP] Japan ................................ 55/122789
Sep. 4, 1980 [JP] Japan ................................ 55/122790

[51] Int. Cl.$^3$ ............................................ G09F 11/02
[52] U.S. Cl. ...................... 40/475; 40/378; 40/532
[58] Field of Search ........................ 40/475, 378, 532

[56] References Cited

U.S. PATENT DOCUMENTS

| | | | |
|---|---|---|---|
| 2,116,287 | 5/1938 | Schewelov | 40/475 |
| 2,552,448 | 5/1951 | Ortendahl | 40/378 |
| 3,343,149 | 9/1967 | Bleiman | 40/378 |
| 3,756,356 | 9/1973 | Loyd | 40/378 |
| 4,060,919 | 12/1977 | Sasaki | 40/532 |
| 4,257,179 | 3/1981 | Oka et al. | 40/475 |

Primary Examiner—Gene Mancene
Assistant Examiner—Wenceslao J. Contreras
Attorney, Agent, or Firm—Staas & Halsey

[57] ABSTRACT

An item input device for a data processing system wherein plurality of flexible page sheets with input information provided thereon overlap the circumference of a rotating shaft in the device main unit and the fixed ends of the sheets are separated by a constant space. The desired page sheets are selected through rotation of the rotating shaft in the winding direction and the reverse direction of the page sheets, thereby guiding the page sheets to the display location. The page sheets overlap each other such that the page sheet unit has the page sheet ends bound thereto separated by a constant space thus the page sheet unit is formed separately from the rotating shaft. The page sheet unit is taken up to the rotating shaft in the page selection ready condition by rotation in the winding direction, and the page sheet unit taken up is released from the rotating shaft by rotation in the reverse direction. Moreover, a clamping member for holding the winding condition of the page sheets is provided. The winding of page sheets is carried out when the rotating shaft rotates in the winding (take-up) direction and the clamping member comes into contact with the page sheets. Page selection of the page sheets is carried out when the clamping member causes the rotating shaft to rotate in the reverse direction via the page sheets.

16 Claims, 22 Drawing Figures

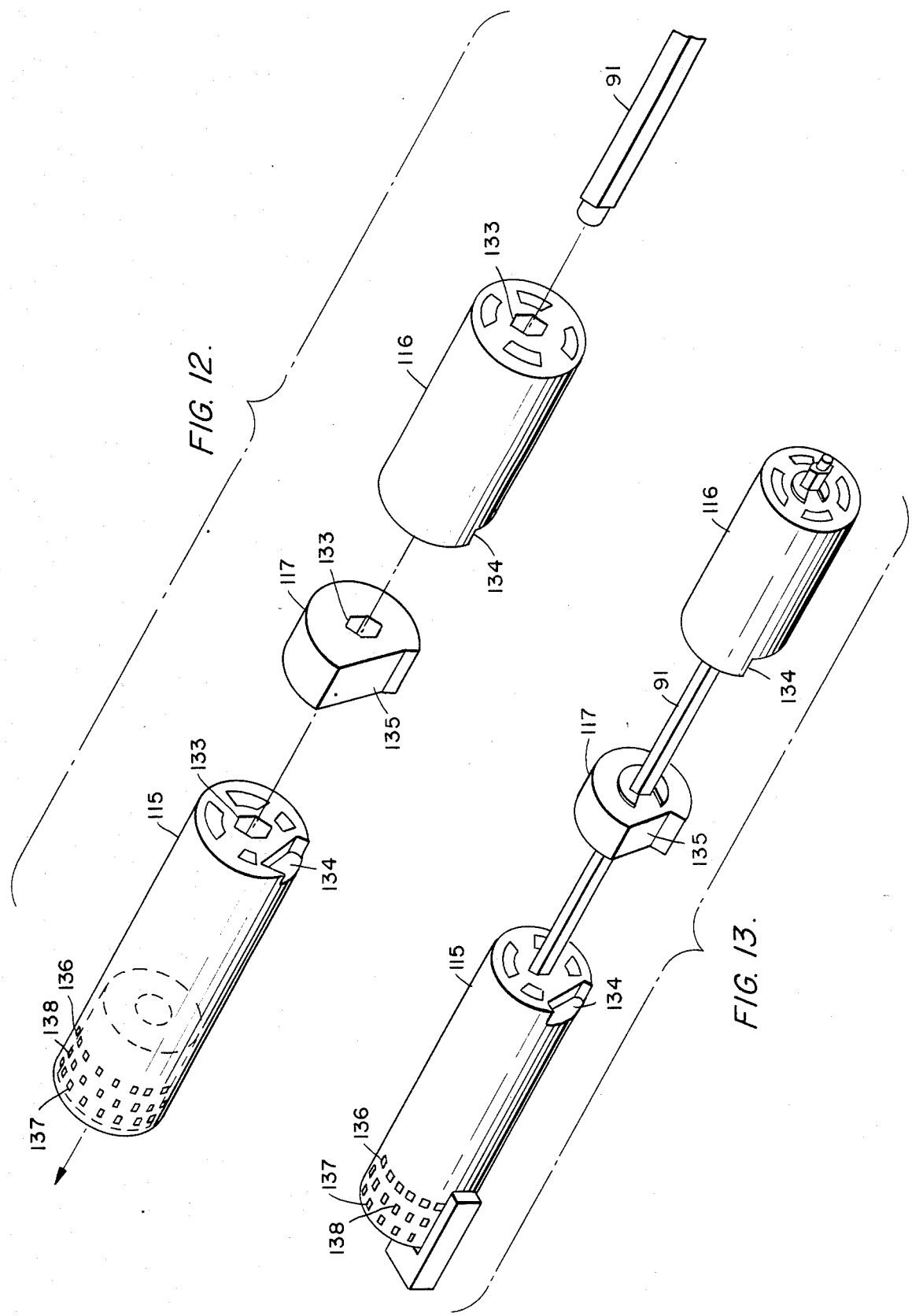

ITEM INPUT DEVICE FOR A DATA PROCESSING SYSTEM

BACKGROUND OF THE INVENTION (1) Field of the Invention

This invention relates to an item input device for inputting multiple item information into an information processing system by a keying operation, and more particularly to a roll type item input device wherein a plurality of page sheets containing input information is rolled about a shaft and the desired page sheet is selected by rotating the shaft.

(2) Description of the Prior Art

An item input device of this type usually employs a page drum formed by directly fixing one end of a plurality of plastic page sheets to the circumferential surface of a rotating shaft. The page drum is accommodated in the main device body to insure free insertion and withdrawal and thus to provide easy exchange of each page sheet.

When an operator operates the desired page selection key of the keyboard, said rotating shaft automatically rotates a specified angle in the direction opposite to the page sheet winding direction, thereby bringing about the "setting" condition wherein the free end of the desired page sheet is placed at the page sheet guide exit. Subsequently, said rotating shaft automatically rotates in the same direction as the page sheet winding direction, guiding the desired page sheet along the lower side of the input keys of the keyboard. Thus, the input keys of the keyboard are given functional displays in accordance with the input information of the page sheet. When an operator operates the desired input keys by referring to the functional display under this condition, the key signal generated by said input key, the page sheet identification signal generated by the page selection key, and the page drum identification signal indicating the kind of drum built in, are input to the data processing system as input information.

The system known in the art has a plurality of page drums previously prepared, each having different input information provided thereon in order to input many pieces of information. Each page drum is built into the main body as explained above in order to ensure the exchange of each page drum. However, page drum replacement has been very troublesome up until now because such replacement has been performed manually by opening the keyboard and cover of the main body. In addition, the existing page drum employs a cartridge type structure having four rotating shafts for extending an endless bolt to hold the page sheet in the winding direction and in its accommodation cabinet, in addition to the rotating shaft and page sheets, thus making replacement troublesome due to heavy weight and large size. In addition, storing requires a wide space. In existing device, page selection is carried out by rotating the rotating shaft to wind the page sheets in the winding direction or reverse direction. Such an operation results in slack in those page sheets being wound around the rotating shaft other than the page sheets selected at the time of page selection. Resultingly, when page selecting operation is repeated several times, the arrangement of a page sheet at the time of winding is irregular, and mis-selection may occur. Such mis-selection increases as the page selecting operation speed increases.

SUMMARY OF THE INVENTION

It is an object of the present invention to provide an item input device which solves the above-mentioned disadvantages of the prior art and more simply effectuates the page exchange work.

It is another object of the present invention to provide an item input device which assures stable and reliable page selecting operation and eliminates mis-selection, even during a high speed operation.

The various objects of this invention are attained by an item input device wherein a plurality of flexible page sheets with input information printed thereon, are wound overlappingly around the circumference of a rotating shaft. The free end of each sheet is isolated into a constant space such that selected page sheets are guided to the display location when said rotating shaft rotates in the winding direction of said page sheets and then reverses direction. Said page sheets overlap each other and the entire page sheet unit with their free ends while isolated in the constant space, and the bound ends are separated from said rotating shaft. Said page sheet unit is wound to said rotating shaft by said rotation of the shaft in the winding direction during the page selection ready condition, and then the page sheet unit is released from said rotating shaft by said rotation in the reverse direction.

Moreover, the objects of the present invention are attained by an item input device wherein the page sheets are wound around the rotating shaft during page winding through rotation of said rotating shaft in the winding direction, the rotating force is transmitted to said rotating shaft through the page sheets wound during the page selection, and said rotating shaft then rotates in the reverse direction.

BRIEF DESCRIPTION OF THE DRAWINGS

FIG. 10 to FIG. 14 show the structure of the page selection mechanism of the present invention.

DESCRIPTION OF THE PREFERRED EMBODIMENTS

Figure 1:
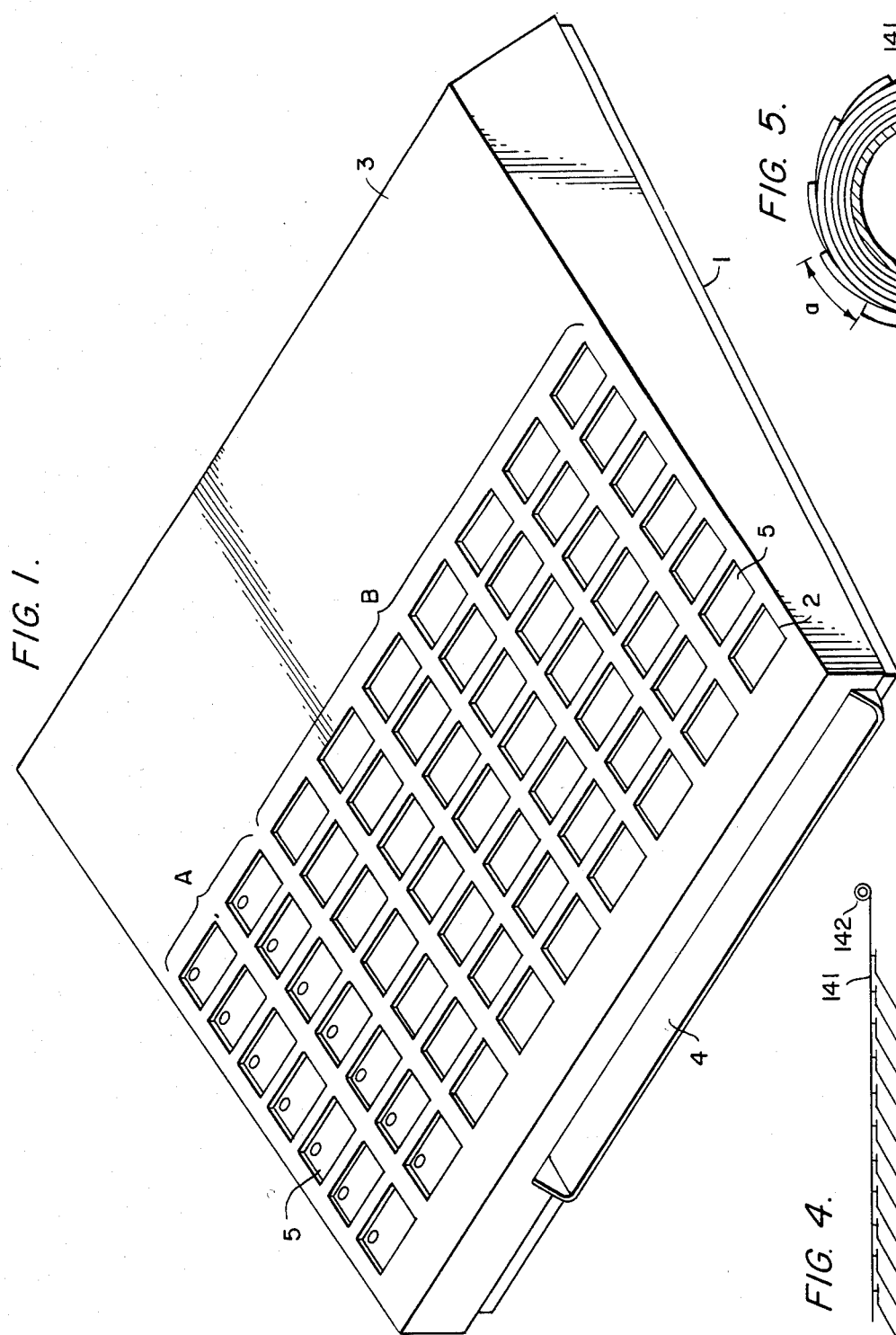
FIG. 1 is a perspective view of the item input device of the present invention.

FIG. 1 is a perspective view of the item input device of the present invention. The main body of said device is composed of the keyboard explained later and the cabinet where the metal base plate 1 mounting the page change-over mechanism is covered with the metal cover 3 providing a plurality of rectangular through holes 2 arranged in the form of a lattice. At the front side of the device, the page sheet exchange mouth 4, which is internally coupled to the interior of the cabinet, is provided. Moreover, at upper left side of rectangular through holes 2, thin type push button switches 5, which effectuate the switching operation by vertical movement of the keytops, are provided. Said push button switches 5 are classified into page selection key group A (14 keys) for selecting the desired page sheets, and the input key group B (49 keys in the figure) for inputting information.

Figure 2:
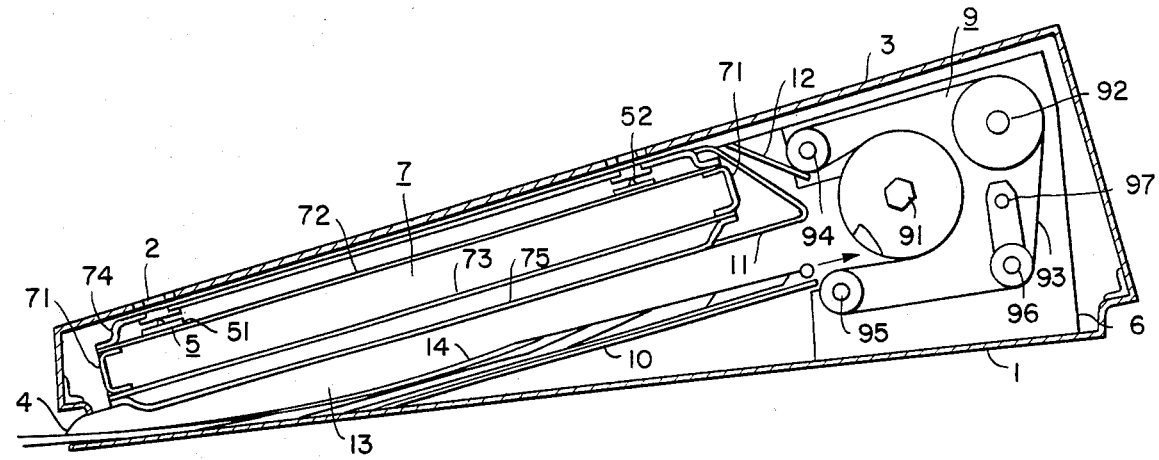
FIG. 2 is the side sectional view of FIG. 1.

FIG. 2 is a right side, sectional view outlining the interior of the device shown in FIG. 1. As shown in FIG. 2, a pair of side walls 6 arranged face to face are provided on the surface of base plate 1 (in the Figure, only one side wall is indicated). The keyboard 7 for mounting the push button switches 5 is provided between said side walls 6 and the page selection mechanism 9 is provided at the rear side of said keyboard 7.

The keyboard 7 is provided with a printed circuit (PC) board 72 for mounting the switch parts 51 of the push button switches 5, and a PC board 73 for mounting the circuit elements such as the keyboard encoder etc., arranged above and below U-shaped metals 71 connecting their ends. At the front of the PC board 72, the switch guide plate 74 for guiding the keytop 52 for the switch 51 is provided, while at the rear side of PC board 73, the page sheet guide plate 75 is provided for guiding the page sheet unit 14, which will be explained, more fully later. In addition, the keyboard 7 is provided between the switch guide plate 74 and cover 3 by the space where the selected page sheet is guided.

On the other hand, the page selection mechanism 9 provides a rotating shaft 91 for winding the page sheet unit 14, a drive shaft 92 connected to a stepping motor (not illustrated) for rotating said rotating shaft 91, an endless belt 93 which works as the clamping material for holding the page sheet unit 14 in the winding direction of the rotating shaft 91, and the shafts 94, 95, 96 for bridging said belt 93 over the shafts 91 and 92. The shaft 96 is freely movable about the shaft 97 in order to keep constant the tension of blet 93.

Moreover, the inclined guide plate 10 is provided on the base plate at the lower side of the keyboard 7 parallel to the guide plate 75, while the guide plates 11 and 12 forming the guide path of each selected page sheet are provided in the space extending from the rotating shaft 91 to the guide plate 74. The space between the guide plates 10 and 75 forms the page sheet material guide path 13 with the forward end opening to the exchange mouth 4, while the backward end opens near the rotating shaft 91. FIG. 2 shows the condition wherein the page sheet unit 14 is guided into the path 13 from the exchange mouth 4.

Figure 3:
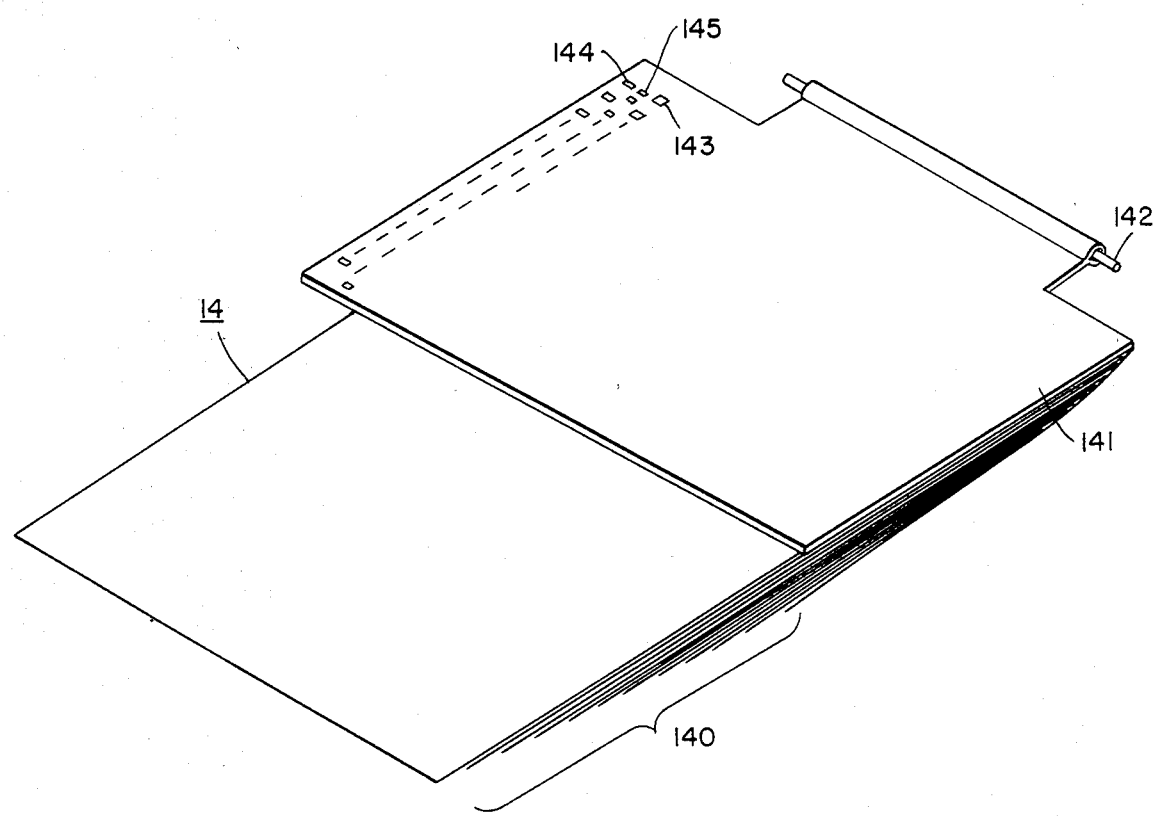

FIG. 3 shows the perspective view of the page sheet unit 14 of the present invention. The page sheet unit is composed of a plurality of page sheets 140 in the same shape and consisting of flexible material such as polyester film, and the base sheet 141 consisting of non-transparent flexible material. The page sheets 140 are given illustrated information (symbols, signs, characters etc.), by e.g., printing etc., for providing funtional indications to the push button switches 5 of the input key group B at the surface. Respective page sheets 140 are given indications of different input data, which assures a plurality of item data.

Figure 4:
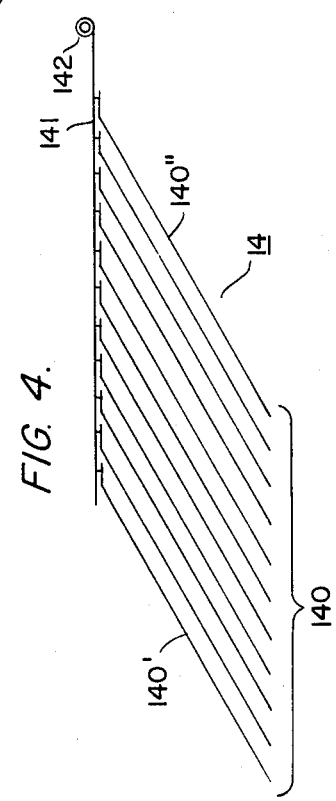

The base sheet 141 is a little thicker than the page sheet 140 and the take-up end of the base sheet 141 is provided with a linkage pin 142 consisting of metal material. On the information side of, a page sheet, the page sheet unit identification holes 143 and page sheet identification holes 144, 145, which allow the light to pass therethrough, are provided in the form of lines, thereby the page identification means is formed. One end of each page sheet 140 is fixed to the base sheet 141 at equally-spaced intervals as shown in FIG. 4.

Figure 5:
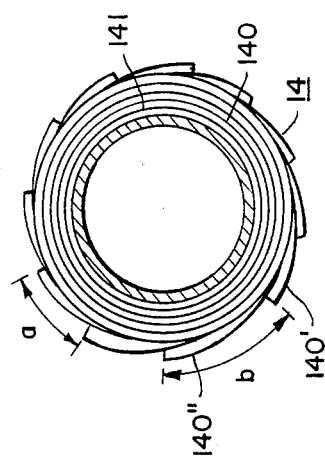
FIG. 3 to FIG. 7 show the page sheet unit of the present invention.

FIG. 5 shows the winding condition of page sheet unit 14 where the base sheet 141 is wound like a drum. The other end of the page sheet 140 is exposed for a specified length in the take-up direction. In this case, the length of the free end of the page sheet 140 exposed is the same, i.e., dimension "a" for each page, except for the final page sheet 140″. On the other hand, the length of the last page sheet 140″ covered with the starrting page sheet 140′ is determined as dimension "b". Dimension "b" is larger than dimension "a" and desirably the winding diameter of base sheet 141 is so determined that b is equal to "2a".

Figure 6:
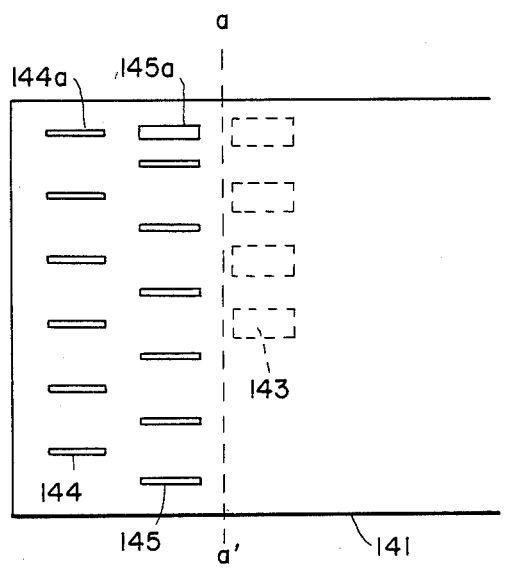

FIG. 6 shows the enlarged plan view of the page identification means provided at the left side of base sheet 141 of FIG. 3. As shown in this Figure, the 1st column hole 144 for page sheet identification is the same in number as the number of sheets of page sheet 140 and is provided on the same line as the location of the page sheet 140 for the base sheet 141. In addition, each 2nd column hole 145 for page sheet identification is formed to the right of the center of each pair of 1st column holes 144, and is in the shape of the same slit width. However, the 1st hole 145a of the 2nd column holes 145 is located at the starting end of the base sheet 141 and is formed at the same position as the 1st hole 144a of the 1st column hole 144, but with a wider slit than 1st hole 144a. Moreover, the specified number of page sheet unit identification holes 143 is formed at the position corresponding to each of the 1st column holes 144 and its slit width is wider than that of the 1st hole 145a of the 2nd column hole 145.

The slit width dimensions of respective holes are related as follows: the page sheet unit identification hole 143 the > 1st hole 145a of the 2nd column hole 145 the > 1st column hole 144, and 1st column hole 144 = all 2nd column holes other than the 1st hole 145a of the 2nd column hole 145.

For the page sheet unit 14, a plurality of page sheets 140 containing different data items are prepared beforehand and the number of holes and locations of the page sheet identification holes 143 are different.

Figure 7:
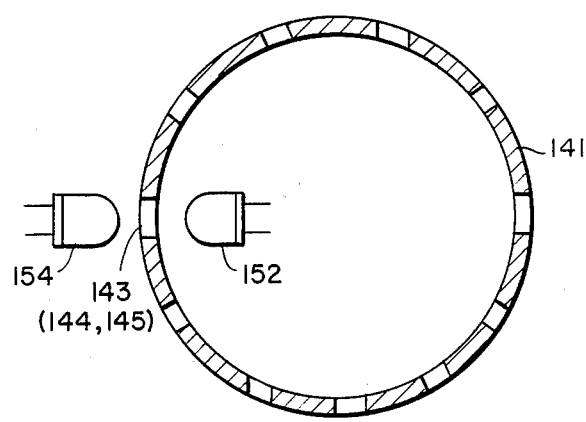

FIG. 7 outlines the condition wherein the base sheet 141 is wound to the rotating shaft 91. In this condition, the light emitting element 152 consisting of a light emitting diode (LED), and a light sensing element 154 consisting of a phototransistor are arranged face to face on both sides of the base sheet 141, thereby the identification holes 143, 144, 145 can be detected.

The selected page sheet and page sheet unit identification means will now be explained using the embodiment by referring to the identification signal generator circuit shown in FIG. 8 and the operating signal waveform shown in FIG. 9.

Figure 8:
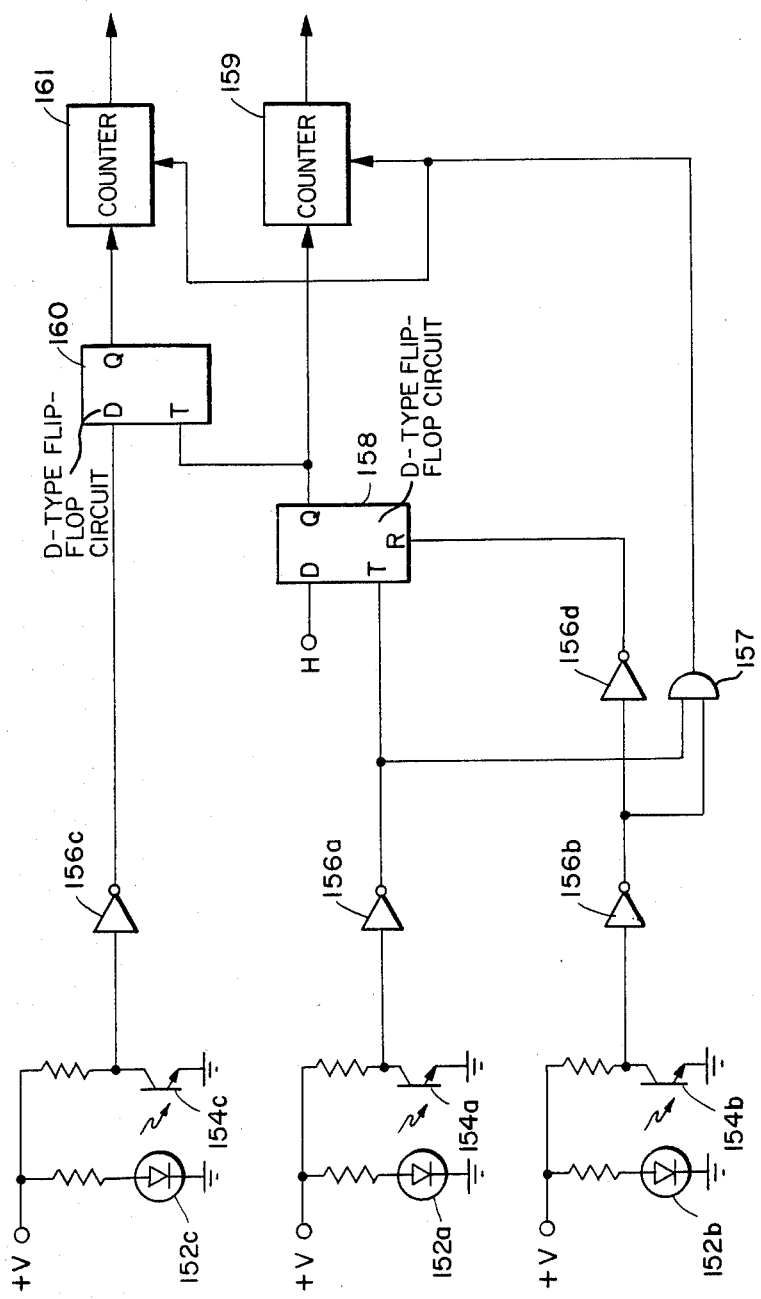

In FIG. 8, 152a are the light emitting element and the light sensing element, respectively for detecting the 1st column hole 144 for page sheet identification; 152b and 154b are the light emitting element and the light sensing element, respectively for detecting the 2nd column hole 145 for page sheet identification; 152c and 154c are the light emitting element and the light sensing element, , respectively, for detecting the page sheet unit identification column hole 143; 156a, 156b, 156c, 156d are invertor circuits; 157 is an AND circuit; 158 is D type flip-flop circuit wherein terminal D once holds the page pulse generated by the 1st column hole 144 at a constant voltage H; 159 is a counter circuit which counts an output pulse of 158 with the clock pulse of the constant period; 160 is D type flip-flop circuit for once holding the sheet material pulse generated by the page sheet unit identification column hole 143; and 161 is the counter circuit which counts the output signal from 160 with the clock pulse of the constant period.

Figure 9:
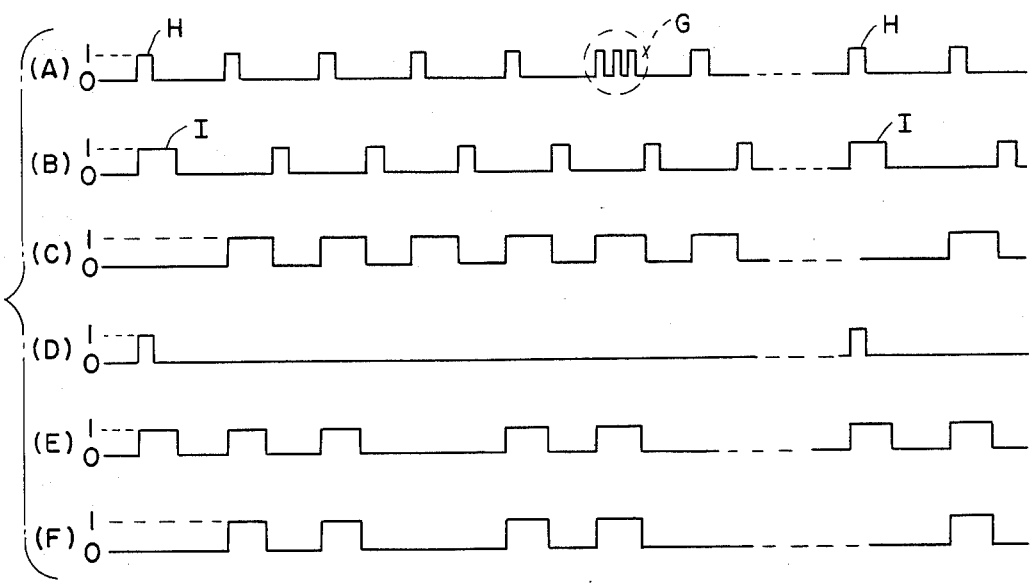
FIG. 8 and FIG. 9 schematically show the structure and operation of the page sheet identification signal generator of the present invention and the operating signal waveform, respectively.

In FIG. 9, the pulse waveform (A) is the output waveform of the invertor 156a, (B) is the output waveform of invertor 156b, (C) is the output waveform of flip-flop circuit 158, (D) is the output waveform of the AND circuit 157, (E) is the output waveform of invertor 156c, and (F) is the output waveform of flip-flop circuit 160.

In this page identification circuit, the light sensing elements 154a, 154b, and 154c operate when the light emitted from the light emitting elements 152a, 152b, 152c passes the 1st column hole 144, 2nd column hole 145 and identification hole 143, respectively, and transmit the slit pulse corresponding to such slit width to the invertors 156a, 156b, 156c, respectively. When the page pulse of FIG. 9(A) is sequentially input to the input terminal T, the output terminal Q of the flip-flop 158 is set. The clear pulses (inverted pulse train of FIG. 9(B), which are sequentially input to the clear terminal R via the invertor 156b, clear the output Q for each pulse of FIG. 9(A), thereby the output pulse of FIG. 9(C) is sequentially input to the counter circuit 159 and counted.

As explained above, the flip-flop 158 has the structure that it is set by the page pulse of FIG. 9(A) and is sequentially cleared by the clear pulse of FIG. 9(B). This fact assures than extra pulses are not counted even when the page pulses (G of FIG. 9(A)) are frequently generated during page selection due to unwanted external vibration, etc.

When the pulses of FIG. 9(E) and (C), synchronized to the input/output terminals D, T, are input, the flip-flop 160 sends an output pulse of FIG. 9(F) to the counter circuit 161 from the output terminal Q. Thus, such output pulse is counted.

Moreover, since the 1st hole 144a of the 1st column hole 144 and the 1st hole 145a of the 2nd column hole 145 are placed on the same line as explained above, the light sensing elements 154a, 154b operate simultaneously to generate the pulses H and I shown in FIG. 9(A) and (B), respectively. These pulses cause the pulse shown in FIG. 9(D) to be input to the counters 159, 161 from the AND circuit 157. This is the reset pulse which resets the counted values of counters 159, 161 at a constant period and initializes them.

The identification signals of this identification circuit are generated as follows. Namely, when the page sheet unit 14 is hooked to the rotating shaft 91 and wound for page selection, the counters 159, 161 are initialized by the 1st reset pulse of FIG. 9(C) due to the pulses H and I of FIG. 9(A) and (B), respectively. The rotating shaft 91 is so controlled as to make several turns (two turns in an embodiment) during the period from this original condition to that where the page sheet unit 14 is wound and the desired page sheet is set. During this take-up period, the counter 161 sequentially counts the output pulse (FIG. 9(F)) of the flip-flop 160 depending on data indicating the existence or non-existence of identification hole 143 obtained in synchronization with the page pulse of FIG. 9(A) and outputs a value counted until the next 2nd reset pulse is applied to the external data processing system as the page sheet unit identification signal. This identification signal is always output for each turn of the page sheet unit 14.

The counter 159, which is initialized by the 1st reset pulse, sequentially counts the output pulse (FIG. 9(C)) of the flip-flop 158 until the next 2nd reset pulse is applied and outputs this value to the data processing system as the data indicating the take-up condition of the page sheet unit 14 (, i.e., the condition where the page sheet unit 14 is perfectly taken up to the rotating shaft 91).

Succeedingly, the counter 159, which is initialized again by the 2nd reset pulse, sequentially counts the output pulse of flip-flop 158 until the 3rd reset pulse is applied and inputs this counted value to the data processing system as the selected page sheet identification signal. Moreover, the counter 159 also counts the output pulses of the flip-flop 158 until the rotating shaft 91 makes a turn in the reverse direction thereby guiding the selected page sheet, and inputs this counted value to the data processing system as the data indicating the page sheet display condition. Thus, the counter 159 sends the page sheet unit take-up condition signal, the selected page sheet identification signal, and the selected page sheet display condition signal.

The data processing system can then identify what kind of page sheet is loaded and which page sheet is selected from said selected page sheet identification signal and said page sheet material identification signal obtained from the counter 161, and thereby the code signal generated by depressing the push button switch 5 can be defined.

The page selection mechanism of the present invention will be explained by referring to FIG. 10 to FIG. 14.

Figure 10:
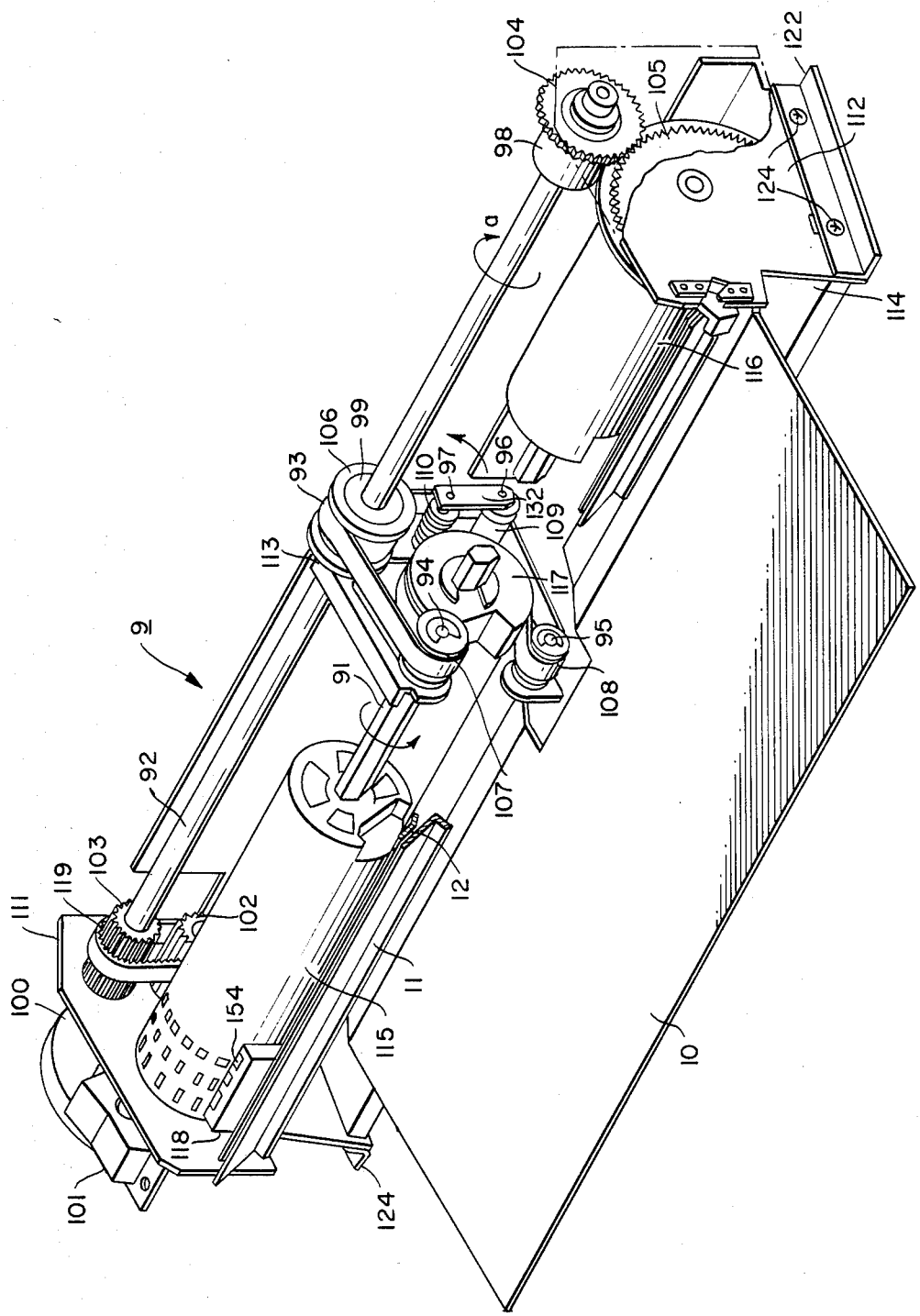

FIG. 10 is the partially cut-away perspective view of the entire page selection mechanism 9 of the present invention. As explained above, 91 is the rotating shaft; 92 is the drive shaft; 93 is the endless belt; 94 to 97 are shafts; 10,11 and 12 are guide plates; 98 and 99 are the oneway clutches which rotate in synchronization in only one direction of the drive shaft 92, but rotate loosely for the rotation in the reverse direction and are provided at the intermediate part and at the one end of the drive shaft 92; 100 is the stepping motor consisting of a pulse motor; 101 is the seesaw switch for turning motor 100 on-off; 102, 103, 104 and 105 are gears; 106, 107, 108 and 108 are pulleys; 110 is the recovery coil spring; 111, 112 and 113 are metal holding plates; 114 is the metal bottom plate; 115, 116 and 117 are rollers; 118 is the support plate mounted to the holding plate 111 and having three light sensing elements 154 opposite the column holes; and 119 is the timing belt.

Figure 11:
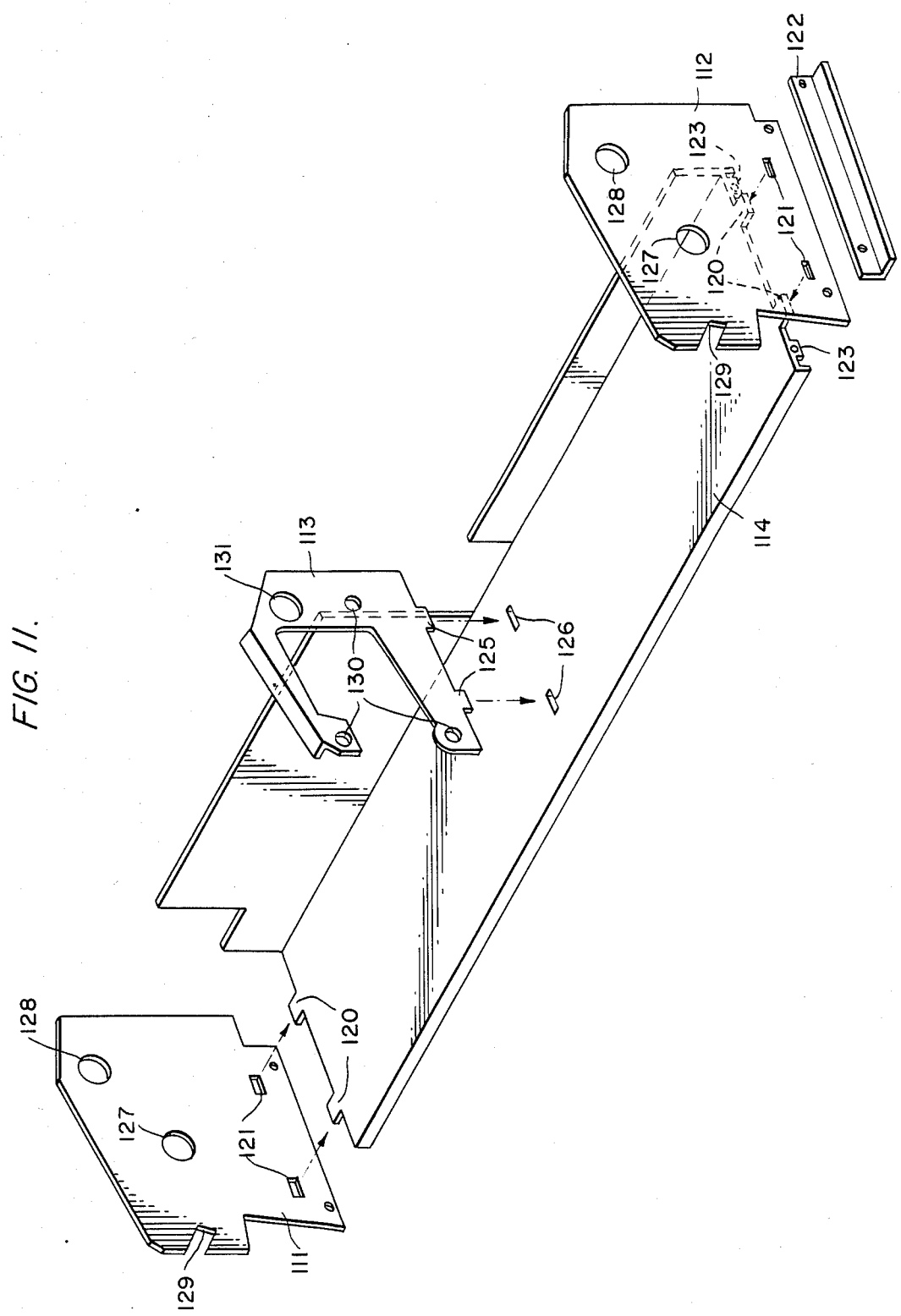

As shown in FIG. 11, the support frame which supports the rotating shaft 91, etc., is formed by vertically loading the holding plates 111, 112 on both sides of bottom plate 114, while the holding plate 113 is located at the center of bottom plate 114. In such loading means, the projections 120, formed in both ends of the bottom plate 114, are engaged with the holes 121 of the holding plates 111, 112. Thereafter, as seen in FIG. 10, the tongue element 123 has screwed thereto (refer to FIG. 10) the clamp plate 122 via screws 124. In the case of holding plate 113, projections 125 are engaged to the holes 126, and thereafter the end of each projection 125 is twisted. The holding plates 111, 112 have through holes 127, 128 in order to support both ends of the rotating shaft 91 and drive shaft 92 with freedom of rotation and a slit 129 for mounting the guide plate 12. In addition, the holding plate 113 is provided with the holes 130 for fixing the shafts 94, 95 and 97, and the hole 131 through which the drive shaft 92 is loaded.

One of each shaft 94, 95 and 96 is inserted into the holes 130 of the holding plate 113 and thereafter such ends are fixed by a calking method. Moreover, after inserting the pulleys 107, 108 and 109 on shafts 94, 95 and 96, respectively, the other they are protected protected from coming out by an E ring, etc.

As shown in FIG. 10, one end of shaft 97 is provided with an inter-connecting plate 132 assuring free pivoting and rotation, while the other end of said inter-connecting plate 132 is provided with a fixed shaft 96 through which the pulley 109 is loaded assuring free rotation, and said inter-connecting plate 132 is always pressed outward as indicated by the arrow mark by means of the recovery coil spring 110 giving a constant tension to the belt 93. After the pulleys 107 to 109 are mounted, the holding plate 113 is loaded to the bottom plate 114 as explained previously.

The structural characteristic of the support frame thus formed is that the positioning of its parts is performed by abutting the material cutting surface and the material surface of the holding plates 111, 112, 113 and the bottom plate 115. This structure assures very accurate assembling because no-bent parts are included resulting in a highly efficient engagement between projections and holes for assembling.

As also shown in FIG. 10, the drive shaft 92 is loaded by the gear 103 at one end, the one-way clutch 99 aggregating the pulley 106 in the outside at the intermediate part, and the one-way clutch 98 aggregating the gear 104 in the outside at the other end.

As shown in FIG. 10, FIG. 12 to FIG. 14, the rotating shaft 91 consists of a metal rod having a hexagonal cross section, and has loaded thereon the rollers 115, 116 at both ends and roller 117 at the center. The rollers 115, 116 and 117, as shown in FIG. 12, each having at their centers, respectively, a through hole 133 also having a hexagonal cross-section. The rollers 115 and 116 each provide a crescent-shaped groove 134 to which the pin 142 of page sheet unit 14 is engaged at their opposing ends. The cut-away 135, for escaping the pin 142 is formed at a part of the circumference of the roller 117. Moreover, the outer end of roller 115 is formed cylindrically, and the page sheet unit identification holes 136 and page sheet identification holes 137, 138 are formed in the form of lines through the circumferencial wall. The page sheet identification holes 137, 138 are formed opposite the page sheet identification holes 144, 145 formed on the base sheet 141 of the above-mentioned page sheet unit 14. The page sheet unit identification holes 136 are correspondingly located at the position on the horizontal line of the page sheet identification 137.

When the base sheet 141 is taken up to the roller 115, the page sheet identification holes 137 match holes 144 and holes 138 match holes 145. The page sheet unit identification holes 143 of the page sheet 141 match the page sheet unit identification holes 136 of the roller 115 corresponding thereto, and the unnecessary hole which does not match the hole 143 is shaded because the base sheet 141 is composed of the non-transparent material.

Thereby, the desired page sheet unit identification signal can be obtained.

Figure 14:
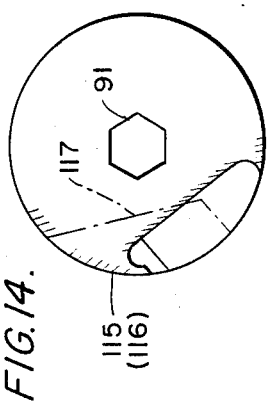

After these rollers 115, 116, 117 are formed by the resin mold method, they are loaded to the rotating shaft 91 as shown in the perspective view and sectional view of FIG. 13 and FIG. 14, respctively.

When this rotating shaft is used, the page sheet identification holes 137, 144 and 145 match as explained above, and therefore, it is also possible to use the page sheet unit in such a way that the base sheet 141 is cut along the cutting line a . . . a' shown in FIG. 6 and the page sheet identification holes 144, 145 are removed. Such page sheet unit is rather effective from the point of view of the strength of the base sheet 141 because a more highly reliable identification signal can be obtained.

As an example of the assembly of the page selection mechanism, the holding plate 113 mounting the pulleys 107, 108 and 109 is attached directly to the bottom plate 114. Thereafter, the drive shaft 92 is mounted through the insertion hole 131 (for example, mounted after insertion of gear 103). The rotating shaft 91 having the rollers 115, 116, 117 is arranged parallel to the drive shaft 92 (through engagement with the gears 104 and 105) and said drive shaft 92 and rotating shaft 91 are mounted to the holding plates 111 and 112 in such a manner that these shafts are supported with free rotation. In addition, the holding plates 111 and 112 are mounted to both sides of bottom plate 114, and the motor 100 is also installed at holding plate 111. Thereafter, the guide plates 10 and 12 are installed in the slit 129 between the bottom plate 114 and holding plates 111, 112, the belt 93 is bridged over the pulleys 106, 107, 108 and 109, and the timing belt 119 is bridged over the gears 102 and 103. Thereby the page selection mechanism can be obtained as shown in FIG. 10. The item input device of the present invention can be attained by installing such page selection mechanism into the cabinet as shown in FIG. 2.

The page selecting operation of the item input device of the present invention as explained above will be explained by referring to FIG. 2, FIG. 10 and FIG. 15 to FIG. 19. In these figures, the element given the same reference numeral as those given above indicates the same element.

The take-up operation of the page sheet unit 14 is carried out as explained below. The desired page sheet unit 14 is at first inserted into the guide path 13 from the exchange mouth 4 as shown in FIG. 2 and is then put into the take-up ready condition by allowing the linkage pin 142 of base sheet 141 and the rotating shaft 91 in come to contact with each other.

Figure 15:
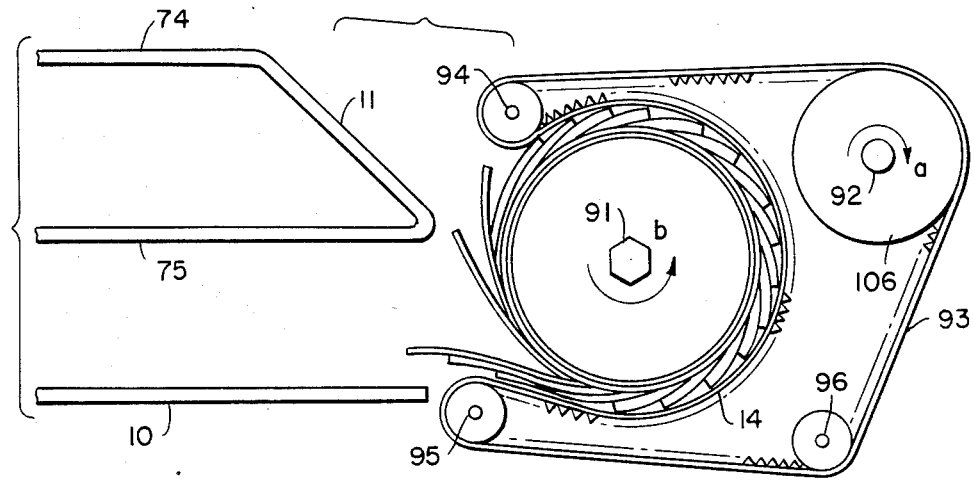
FIG. 15 to FIG. 19 show the page selecting operation and the page sheet unit exchanging operation of the page selecting mechanism of the present invention.

When the specified push button switch 5 of the page selection key group A, as shown in FIG. 1, corresponding to the selected page sheet 140, is depressed for switching, the motor 100 automatically causes the gear 102 to rotate. This rotating force is transmitted to the gear 103 via the timing belt 119. Resultingly, the drive shaft 92 rotates for a specified angle in the direction indicated by the arrow marked "a", a shown in FIG. 15. When the drive shaft 92 rotates in the direction a, the one-way clutch 98 rotates synchronously only in the direction a and therefore the rotating shaft 91 also rotates for the specified angle in the winding direction indicated by the arrow marked "b" as also shown in FIG. 15, via the gears 104 and 105.

On this occasion, since the one-way clutch 99 is so set that it rotates loosely in direction a, the belt 93 does not rotate. When the rotating shaft 91 rotates in the direction b, the page sheet unit 14 shown in FIG. 2 is taken up to the rotating shaft 91, as shown in FIG. 15, while the linkage pin 142 is linked to the groove 134 and said page sheet unit is being held by the belt 93. Upon completion of rotation of the rotating shaft 91 for the specified angle in the direction b, as shown in FIG. 16, the desired page sheet 140 is set so that only its free end abuts the guide plate 11.

Figure 17:
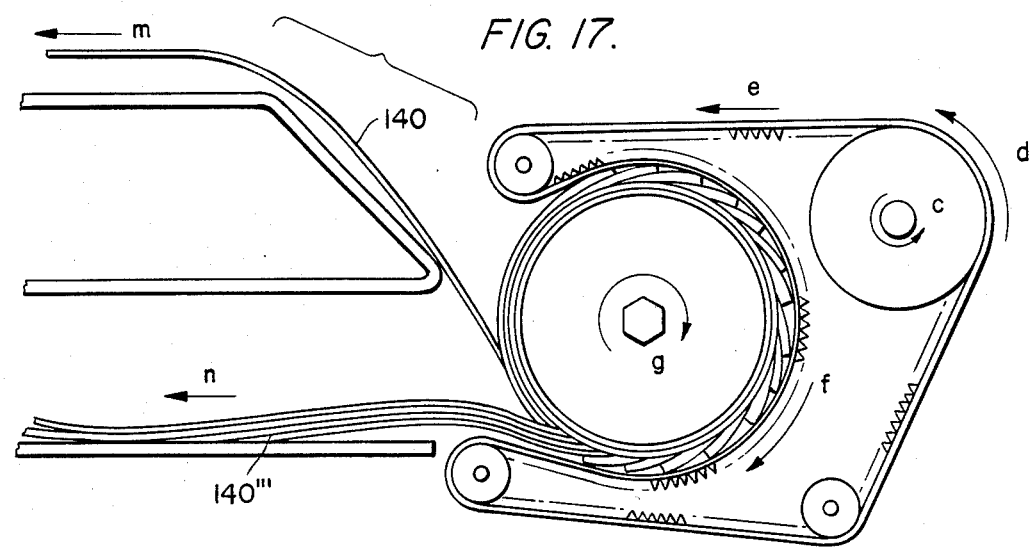

Succeedingly, in this condition, the motor 100 is automatically driven in the reverse direction and the drive shaft 92 rotates in the direction "c" as shown in FIG. 17. The one-way clutch 99 then rotates synchronously, causing the pulley 106 to rotate in the direction "d". Thereby, the belt 93 rotates in the directions "e" and "f" and the rotating shaft 91 also rotates in the reverse direction indicated by the arrow marked "g". As a result, the desired page sheet 140 rotates in the direction "m" while the other page sheet 140 ''' rotates in the direction "n". Here, the one-way clutch 98 is set so that it rotates loosely for the rotation of drive shaft 92 in the direction c. Resultingly the rotating force is not transmitted by the gears 104 and 105.

When the rotating shaft 91 rotates for the specified angle in the direction g, the desired page sheet 140 is guided on the guide plate 74 through the switching operation of push button switch 5 of the input key group B giving the functional display to the push button switch 5, while the other page sheet 140''' is accommodated in the guide path 13. The page selecting operation is thus completed.

Figure 16:
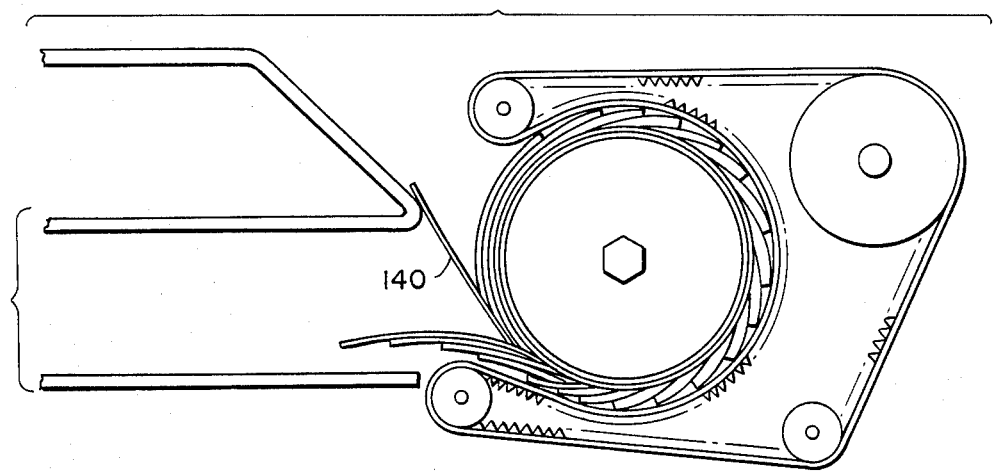

When the other push button 5 of page selection key group A is depressed from the condition of FIG. 17, as explained above, the rotating shaft 91 rotates automatically for the specified angle by the gears 104 and 105 as shown in FIG. 15 taking up the desired page sheet 140 on the guide plate 74 and thereafter the specified desired page sheet is set as shown in FIG. 16. The rotating shaft 91 then rotates in the reverse direction by means of the belt 93 for the specified angle and said desired page sheet 140 is again selected as shown in FIG. 17.

The exchange operation of page sheet unit 14 taken up to the rotating shaft 91 will now be explained. When it is required to exchange the page sheet unit 14 while in the condition of FIG. 17, required first is the switching operation of the push button switch 5 only for the page sheet unit exchange in the page selection key group A. As explained above, the rotating shaft 91 automatically rotates for the specified angle in the winding direction as shown in FIG. 15 and the page sheet is set in the condition shown in FIG. 18 after the take-up condition.

Figure 18:
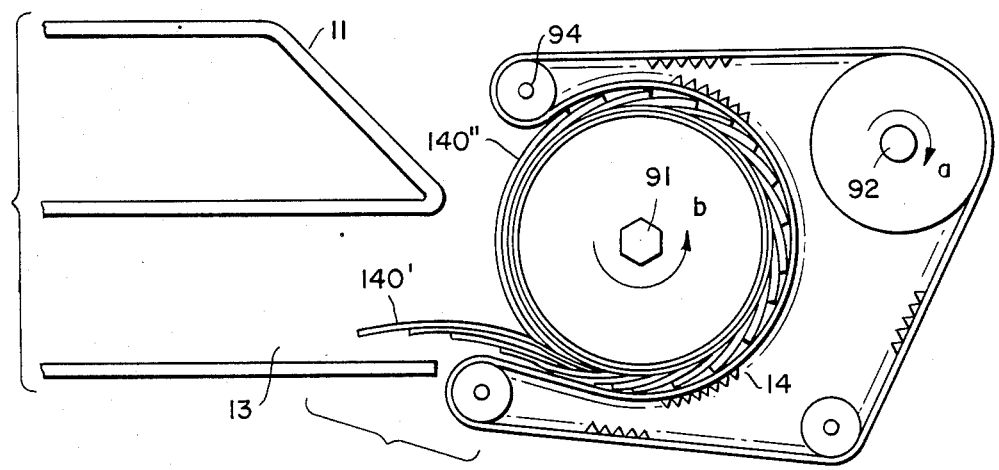
Figure 19:
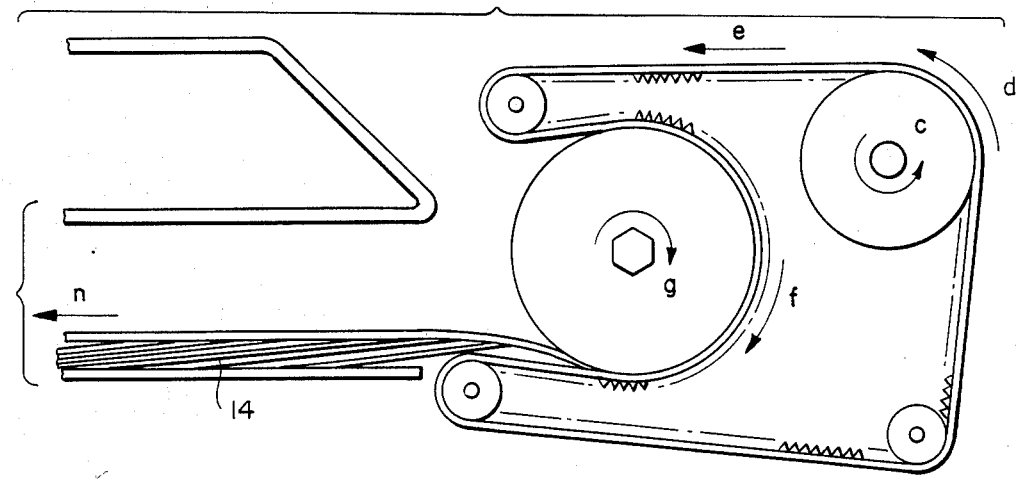

FIG. 18 shows the condition where the free end of the first page sheet 140' passes under the guide plate 11 and is located in the guide path 13, and the free end of the last page sheet 140'' is coupled to the shaft 94. As explained for FIG. 5, this condition is obtained in the page sheet unit 14 because the page sheet unit is set in this condition at the time of take-up wherein the first page sheet 140' and the last page sheet 140'' are arranged just in the condition that a sheet is removed between them. When the rotating shaft 91 is driven by the belt 93, as shown in FIG. 19, in the reverse direction as in the case of FIG. 17, and rotates for the specified angle from the condition indicated in FIG. 18, engagement between the linkage pin 142 and groove 134 is released, the page sheet unit 14 is exhausted into the guide path 13, and the take-up condition shown in FIG. 2 returns again.

In this condition, the one end of said page sheet unit 14 extends from the exchange mouth 4 allowing an operator to withdraw it.

In the above page selection mechanism, at the time of taking up the page sheet unit 14, namely when the page sheet unit 14 is taken up to the rotating shaft 91 from the condition of FIG. 2 to the condition of FIG. 15, and while the page sheet unit 14 rotates in the condition from the take-up condition of FIG. 15 to the condition of FIG. 16, the rotating shaft 91 rotates in the winding direction by the drive shaft 92. However, the belt 93 does not rotate due to the loose rotation of the one-way clutch 99. Therefore, at the timing of such take-up period, the page sheet unit 14 is taken up from the inner side by the rotating shaft 91 without any slack, while at the same time it is receiving the breaking force from the outside by the belt 93. On the other hand, at the time of sending the page sheet unit 14, namely at the time of page selection where the desired page sheet 140 is guided from the condition of FIG. 16 to the condition of FIG. 17, and at the time of exhausting the page sheet unit 14 from the condition of FIG. 18 to the condition of FIG. 19, the rotating shaft 91 is rotated in the reverse direction by the belt 93 via the page sheet unit 14. Therefore, at the time of such page sheet sending operation, the page sheet unit 14 is sent while it is pulled in the reverse direction at the circumference by the belt 93 and as a result, the page sheet unit 14 is sent smoothly without causing any slack.

A pulling force by the belt 93 generated at the time of page sheet sending is obtained when the belt 93 rotates quicker than the rotating shaft 91. With reference to the side of drive shaft 92, such pulling force can be obtained by setting the ratio of gear teeth between the gears 104 and 105 (gear ratio) larger than the ratio of the diameters of the pulley 106 and the roller 117 (pulley ratio). In this way, the gear ratio is always constant but the pulley ratio changes when the diameter of roller 117 changes depending on the take-up amount of the page sheet unit 14. Therefore, the relation between pulley ratio and gear ratio is set so that the ratio between them becomes almost 1:1, or the pulley ratio becomes a little larger than the gear ratio when the page sheet unit 14 is perfectly taken up to the rotating shaft 91 (the roller becomes most thick).

The gear ratio becomes sequentially larger than the pulley ratio when the diameter of roller 117 gradually becomes small by sending out a page sheet when sending of page sheet unit 14 is performed only for a while. For this reason, at the time of sending a page sheet, the rotating speed of belt 93 is almost equal to that of the rotating shaft, or the speed of rotating shaft 91 is a little quicker, but the sending of a page proceeds and the rotating speed of the belt 93 becomes quicker than that of the rotating shaft 91. As mentioned above, on the other hand, the rotating speed of rotating shaft 91 is determined by the gear ratio of the gears 104, 105 and is always constant.

Resultingly, the rotating shaft 91 rotates in the reverse direction while it is receiving a breaking force from the gears 104 and 105 against the rotating force in the reverse direction transmitted to the circumference of the page sheet unit 14 from the belt 93, and a difference of rotating speed between the belt 93 and rotating shaft 91 is absorbed by the slipping rotation of the belt 93 on the page sheet unit 14 taken up.

At the time of sending a page sheet, therefore, the page sheet unit 14 is sent while it is also being pulled by the rotating force of belt 93 applied to the rotating shaft 91, which is further receiving a breaking force, and such pulling force works as a tightening force on the page sheet unit 14 taken up.

As explained previously, part of the rotating force of the belt 93 is converted to a tightening force at the page sheet unit 14 at the time of sending a page sheet due to the relation between the pulley ratio and, gear ratio and therefore, no slack is generated. Simultaneously self-recovery effect appears from irregular initial take-up for the high speed rotation, sudden stop/start of the rotating shaft 91.

Figure 20:
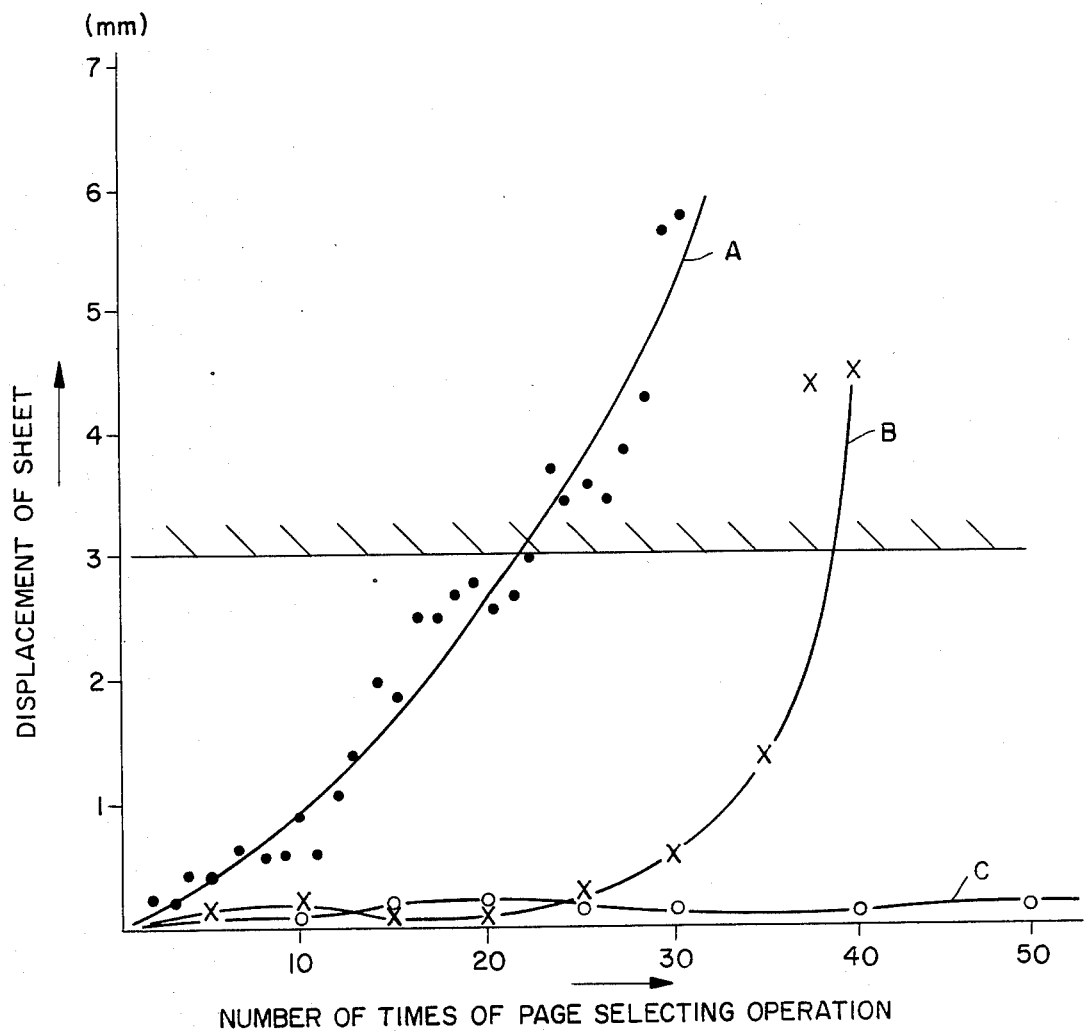
FIG. 20 shows the relation between the page selecting operation and displacement of the end of sheet of the page selecting mechanism of the present invention compared with the known in the art device.

FIG. 20 shows the relation between the page selecting operation and displacement of the sheet end of the page selection mechanism of the present invention in comparison with the existing data, based on the experimental results. In this figure, the horizontal axis indicates the number of times of page selecting operation while the vertical axis indicates displacement in millimeters (mm) of the page sheet end. The curves A, B respectively indicate the characteristic of the existing device, while the curve C indicates the characteristic of the device proposed by the present invention.

The existing device indicating the characteristic of the curve A has the structure that the page selection is carried out by rotating the rotating shaft 91 in the winding direction and reverse direction only with the belt 93. The existing device indicating the characteristic of the curve B has the structure that the rotating shaft 91 is directly connected to the motor 100 and thereby the rotating shaft 91 is rotated in the winding direction and reverse direction for the page selection. On the other hand, the device of the present invention indicating the characteristic of the curve C employs the page selection mechanism as explained previously. Namely, at the time of page winding, the rotating shaft 91 rotates in the winding direction but at the time of page selection, the rotating shaft 91 rotates in the reverse direction by means of the belt 93.

This experiment is carried out under the same conditions regarding the number of revolutions for drive of motor and change-over timing of the rotating direction for the device of present invention and the existing device. The displacement of the page sheet end indicated on the vertical axis is indicated by mm with reference to the normal displacement at the time of taking up the page sheet unit 14.

As is obvious from the experimental results, almost no displacement is generated in the device of the present invention even when the number of selecting operations increases and thereby reliable page selection can be attained. Meanwhile, in the existing device, some slack is generated at the time of winding the page sheet or selection, and displacement becomes gradually large due to accumulation when the number of selecting operations increases. For example, such displacement becomes as long as 3 mm with the number of operations of 20 or 40 times.

In the case of a roll type page selection device, a displacement longer than 3 mm makes the page selecting operation unstable and often causes mis-selection. Moreover, as shown in FIG. 10, the belt 93 which holds the page sheet unit 14 taken up is provided almost at the center of rotating shaft 91 in the page selection mechanism of the present invention. Thereby, as shown in FIG. 16, the page sheet next to the desired one 140 is held at a point by the pulley 107 and the page sheet can be reliably held, assuring stable page selecting operation.

The page selection mechanism of the present invention forms two closed rotating force transmitting paths with only one motor and therefore the device is finished compactly, economically and with less power consumption.

Figure 21:
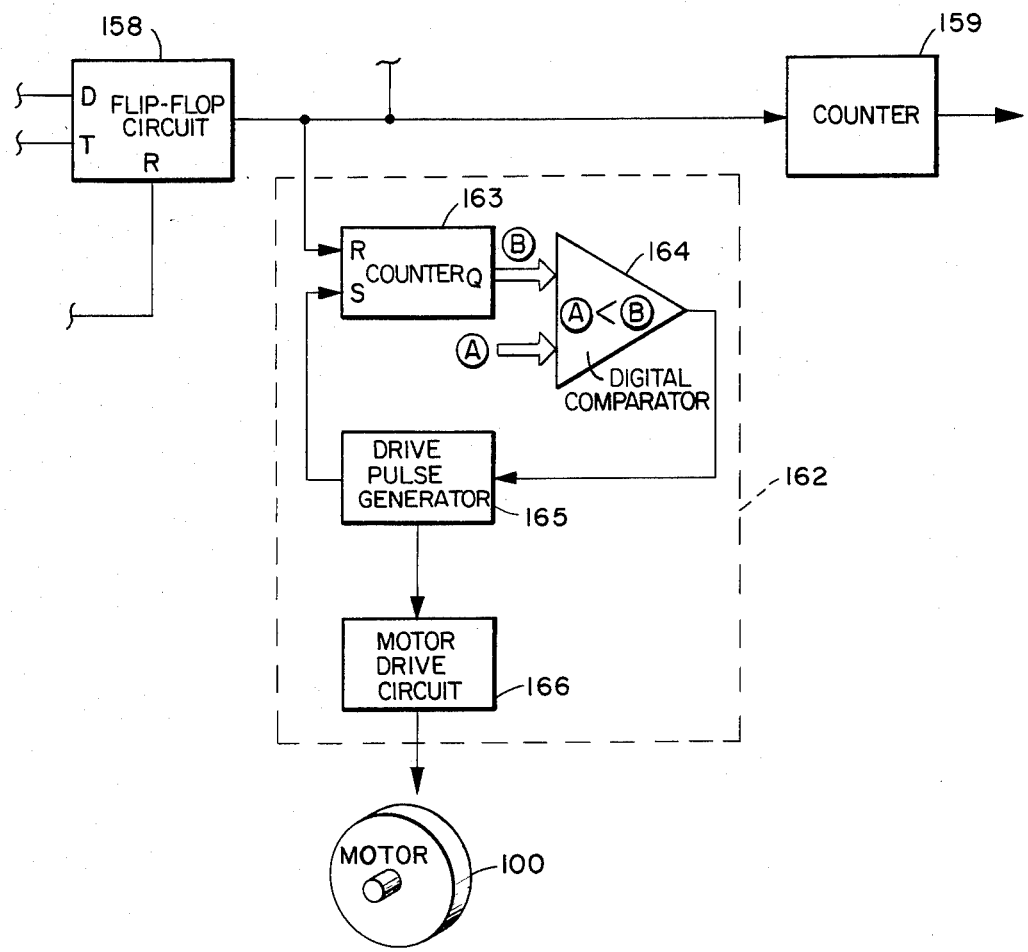
FIG. 21 and FIG. 22 are diagrams showing operation of the drive control of the page selecting mechanism for overload of the page sheet of the present invention.
Figure 22:
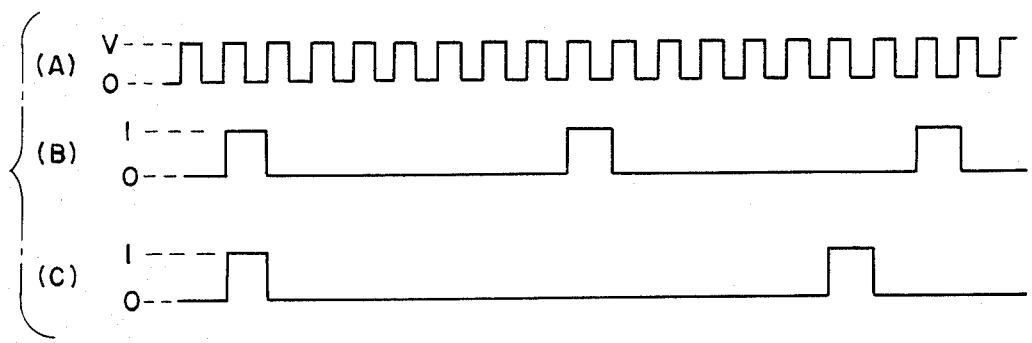

The drive control of the page selection mechanism for the overload of page sheet of the present invention will be explained by referring to FIG. 21 and FIG. 22. FIG. 21 is the block diagram of the drive control circuit of the present invention and FIG. 22 shows the relation between the drive pulse and page pulse.

As seen in FIG. 21, the drive control circuit 162 is connected to the flip-flop circuit 158 and the counter circuit 159 and is composed of the counter 163, a digital comparator 164, a drive pulse generator 165, and a motor drive circuit 166 for the motor 100.

The drive pulse generator 165 generates a voltage pulse having the constant period as shown in FIG. 22(A) and applies this signal to the motor drive circuit 166 and the counter 163. The motor drive circuit 166 drives the motor 100 with the drive pulse of FIG. 22(A). At this time, the motor 100, being composed of a pulse motor as explained above, has a constant rotating angle of shaft for one drive pulse. In addition, this rotating angle is proportional to the number of drive pulses.

Also as explained above, the motor shaft of motor 100 is coupled to the rotating shaft 91 via the belt 119, drive shaft 92, belt 93 and gears 104 and 105, and the rotating angle of said rotating shaft 91 is proportional to the number of drive pulses sent to the motor drive circuit 166. This means that the number of drive pulses required between the page pulses, which is an output pulse of the flip-flop 158 of FIG. 9(C), is a constant in normal operation. In other words, the pulse train of FIG. 22(B) is the enlarged view between pulses of the output pulse of the flip-flop circuit 158 of FIG. 9(C).

As is obvious from FIG. 22(B), the number of drive pulses between page pulses is all equal while the rotating shaft 91 is operating normally. However, if an overload is applied on the page sheet 140 during page selecting operation, an overload is applied on the shaft of motor 100 via the rotating shaft 91 and belt 93, etc. Resulting, as shown in FIG. 22(C), the number of drive pulses between page pulses changes and synchronization between the drive pulse and motor rotation is lost. Thus, the number of drive pulses for obtaining the same rotation increases as compared with the synchronous rotation of FIG. 22(B). Such overload may cause breakdown of page sheet 140 or fault of motor 100.

Thus, the drive control circuit of this invention employs the structure that the drive pulse of the drive pulse generator 165 is input to the set terminal (S) of the counter circuit 163, and simultaneously the output pulse of flip-flop 158 is input to the reset terminal (R), and the count value B sent from the output terminal (Q) of the counter 163 and the specified value A are compared by the digital comparator 164, When A becomes smaller than B, the digital comparator 164 outputs the stop pulse to the drive pulse generator circuit 165 in order to stop the operation. The counter 163 is then reset by the output pulses (FIG. 22(B), (C)) of the flip-flop circuit 15 and sequentially counts the succeeding drive pulses.

Content B of said container 163 is sequentially compared with the specified value A, which is the preset number of drive pulses between page pulses, by the digital comparator 164. When the counter value B exceeds the specified value A (A<B), the drive pulse generator 165 stops, causing the motor 100 to stop the operation.

The motor control means explained above is capable of preventing breakdown of said page sheet when an overload is applied on the page sheet for any reason and causes a drastic effect on the practical use of the device.

We claim:

1. An input device for a data processing system, the device being operable in a winding direction and a reverse direction and having a display location for displaying information, comprising:
   (a) a rotatable shaft;
   (b) a page sheet unit capable of removable attachment with the rotatable shaft, the page sheet unit having
      (i) a flexible base sheet with one end having connected thereto a metal linkage pin, the opposite ends of the metal linkage pin projecting from opposite sides of the base sheet, and the rotatable shaft having grooves for receiving in linking arrangement the opposite ends of the metal linkage pin when the page sheet unit is removably attached to the rotatable shaft, and
      (ii) a plurality of flexible page sheets, each bearing input information designations, each being bound in the page sheet unit separate from the rotatable shaft and each being wound around the circumference of the rotatable shaft such that the plurality of page sheets overlap one another with their radially outermost ends spaced apart therearound and the ends of the plurality of page sheets which are radially innermost during operation are connected to the flexible base sheet so as to be spaced apart around the circumference during operation;
   (c) a page sheet unit exchange mouth opening to the exterior of the device;
   (d) a guide path extending from the exchange mouth to the rotatable shaft; and
   (e) an endless belt extending around part of the rotatable shaft for maintaining the winding direction of the plurality of page sheets of a page sheet unit removably attached to the rotatable shaft,
   wherein the device is operated by inserting a page sheet unit through the exchange mouth and into the guide path so as to link the both ends of the linkage pin and the grooves of the rotatable shaft, by selecting a desired page sheet of the plurality of page sheets by rotation of the rotatable shaft in the winding direction, by deploying a selected page sheet to the display location by rotation of the rotatable shaft in the reverse direction, by releasing the removably attached page sheet unit by rotation of the rotatable shaft in the reverse direction, and by guiding the released page sheet unit out of the device through the exchange mouth via the guide path.

2. A device as recited in claim 1, further comprising:
   (a) voids formed in one edge of the flexible base sheet of the page sheet unit through which light can pass;
   (b) means for directing light to pass through these voids when the page sheet unit is wound on the rotatable shaft; and
   (c) means for detecting light passed through these voids for obtaining page sheet identification signals.

3. A device as recited in claim 1, further comprising:
   (a) voids formed at one edge of the base sheet of the page sheet unit through which light can pass;
   (b) means for directing light to pass through these voids when the page sheet unit is wound on the rotatable shaft; and
   (c) means for detecting light passed through these voids for obtaining a page sheet unit identification signal.

4. A device as recited in claim 1, wherein the rotatable shaft further comprises:
   (a) a roller having voids formed therein through which light can pass;
   (b) means for directing light to pass through these voids; and
   (c) means provided for detecting light passed through these voids for obtaining a page sheet unit identification signal.

5. A device as recited in claim 1, further comprising:
   a keyboard having a plurality of keys,
   wherein, when a page sheet is in the display location, the page sheet is located over the keys and provides respective designations of functions of the respective keys of the keyboard.

6. A device as recited in claim 1, wherein the plurality of page sheets comprises:
   a first page sheet, a second page sheet, a third page sheet and a last page sheet,
   wherein the page sheet unit is so dimensioned that when the plurality of page sheets thereof is wound around the circumference of the rotatable shaft and each page sheet of the plurality of page sheets overlaps one another, the spacing formed between the radially outermost end of the last page sheet and the radially outermost end of the first page sheet in about twice as large as the spacing between the circumferentially consecutive radially outermost ends of the second page sheet and the third page sheet, such that for a particular rotational disposition of the rotatable shaft corresponding to the spacing between the radially outermost ends of the first and last page sheets, page selection operations are prevented, and
   wherein, when a removably attached page sheet unit is to be released, the device operates by rotating the rotatable shaft in the winding direction to said particular rotational disposition, then to rotate the rotatable shaft in the reverse direction to release the removably attached page sheet unit.

7. A device as recited in claim 1,
   wherein, the endless belt extends around part of the rotatable shaft substantially centrally thereof, and
   wherein when the rotatable shaft is caused to rotate in the reverse direction, the rotational force causing the rotation is applied by the endless belt.

8. A device as recited in claim 6,
   wherein the endless belt extends around the rotatable shaft substantially centrally thereof, and
   wherein, when the rotatable shaft is caused to rotate in the reverse direction, the rotational force causing the rotation is applied by the endless belt.

9. A device as recited in claim 7, wherein the endless belt is operatively connected to a drive source means comprising:
   (a) a motor;
   (b) a drive shaft coupled to the motor and arranged parallel to the rotatable shaft;
   (c) a first one-way clutch arranged on a first end of the drive shaft and a second one-way clutch arranged intermediately of the drive shaft, each of the first and second one-way clutches being operable to rotate in mesh with the drive shaft in one direction of rotation of the drive shaft and meshing for respective opposite directions of rotation of the drive shaft, wherein a first end of the drive shaft is connected to the rotatable shaft by way of gear means and the first one-way clutch, and an intermediate part of the drive shaft is connected to the rotatable shaft by way of the endless belt and the second one-way clutch, and wherein rotational force is transmitted to the rotatable shaft through the gear means and the first one-way clutch to effect rotation of the drive shaft in the winding direction and rotational force is transmitted to the rotatable shaft through the endless belt and the second one-way clutch to effect rotation in the reverse direction.

10. A device as recited in claim 8, wherein the endless belt is operatively connected to a drive source means comprising:
   (a) a motor;
   (b) a drive shaft coupled to the motor and arranged parallel to the rotatable shaft;
   (c) a first one-way clutch arrangement on a first end of the drive shaft and a second one-way clutch arranged intermediately of the drive shaft, each of the first and second one-way clutches being operable to rotate in mesh with the drive shaft in one direction of rotation of the drive shaft and meshing for respective opposite directions of rotation of the drive shaft, wherein a first end of the drive shaft is connected to the rotatable shaft by way of gear means and the first one-way clutch, and an intermediate part of the drive shaft is connected to the rotatable shaft by way of the endless belt and the second one-way clutch, and wherein rotational force is transmitted to the rotatable shaft through the gear means and the first one-way clutch to effect rotation of the drive shaft in the winding direction and rotation force is transmitted to the rotatable shaft through the endless belt and the second one-way clutch to effect rotation in the reverse direction.

11. A device as recited in claim 6, further comprising:
   (a) voids formed in one edge of the base sheet of the page sheet unit through which light can pass;
   (b) means for directing light to pass through these voids when the page sheet unit is wound on the rotatable shaft; and
   (c) means for detecting light passed through these voids for obtaining page sheet identification signals.

12. A device as recited in claim 11, further comprising:
   (a) voids formed at one edge of the base sheet of the page sheet unit through which light can pass;
   (b) means for directing light to pass through these voids when the page sheet unit is wound on the rotatable shaft; and
   (c) means for detecting light passed through these voids for obtaining a page sheet unit identification signal.

13. A device as recited in claim 12, wherein the rotatable shaft further comprises:
   (a) a roller having voids formed therein through which light can pass;
   (b) means for directing light to pass through these voids; and
   (c) means for detecting light passed through these voids for obtaining a page sheet unit identification signal.

14. A device as recited in claim 13, further comprising:
   a keyboard having a plurality of keys,
   wherein, when a page sheet is in the display location, the page sheet is located over the keys and provides respective designations of functions of the respective keys of the keyboard.

15. A device as recited in claim 9, further comprising:
   a pulley connected to the rotatable shaft, wherein the endless belt passes around the second one-way clutch and around the pulley, the effective pulley ratio for the endless belt between the second one-way clutch on the drive shaft and the rotatable shaft being smaller than the effective gear ratio between the first one-way clutch on the drive shaft and the rotatable shaft, so that the rotatable shaft is caused to rotate at a higher speed in the reverse direction than in the winding direction.

16. A device as recited in claim 10, further comprising:
   a pulley connected to the rotatable shaft, wherein the endless belt passes around the second one-way clutch and around the pulley, the effective pulley ratio for the endless belt between the second one-way clutch on the drive shaft and the rotatable shaft being smaller than the effective gear ratio between the first one-way clutch on the drive shaft and the rotatable shaft, so that the rotatable shaft is caused to rotate at a higher speed in the reverse direction than in the winding direction.

* * * * *

UNITED STATES PATENT AND TRADEMARK OFFICE
CERTIFICATE OF CORRECTION

PATENT NO. : 4,498,256

DATED : 2/12/85

INVENTOR(S) : Tanaka et al.

Page 1 of 2

It is certified that error appears in the above-identified patent and that said Letters Patent is hereby corrected as shown below:

(57) Line 2, after "wherein" insert --a--;
     Line 12, "space thus" s/b --space. Thus,--.

Col. 1
Line 53, "bolt" s/b --belt--;
Line 57, after "In" insert --the--.

Col. 2
Line 40, after "the" insert --right--;
Line 55, after "the" (first occurrence) insert --device--; delete "device".

Col. 3
Line 36, "material" s/b --member--;
Line 41, "blet" s/b --belt--.

Col. 4
Line 41, "the⟩ 1st" s/b -- ⟩ the 1st--;
Line 42, "the⟩ 1st" s/b -- ⟩ the 1st--;
Line 42, "=" s/b --and--.
Line 61, "152a" s/b --152a and 154a--.

Col. 5
Line 28, "9(B)," s/b --9(B)),--;
Line 37, "than" s/b --that--.

UNITED STATES PATENT AND TRADEMARK OFFICE
CERTIFICATE OF CORRECTION

PATENT NO. : 4,498,256

DATED : 2/12/85

INVENTOR(S) : Tanaka et al.

It is certified that error appears in the above-identified patent and that said Letters Patent is hereby corrected as shown below:

Col. 6
Line 51, "108" (second occurrence) s/b --109--.

Col. 7
Line 8, after "One" insert --end--;
Line 12, delete "the other"; delete "protected";
Line 20, "outerward" s/b --outward--;
Line 38, "10," s/b --10 and--.

Col. 8
Line 6, "respctively" s/b --respectively. The page unit rotation shaft is thus formed.--;
Line 51, delete "in";
Line 52, "to" s/b --into--;
Line 60, "a shown" s/b --as shown--.

Col. 11
Line 43, after "of" insert --the--;

Col. 14
Line 35, "in" s/b --is--.

Signed and Sealed this

Fifth Day of November 1985

[SEAL]

Attest:

*Attesting Officer*

DONALD J. QUIGG

*Commissioner of Patents and Trademarks*